United States Patent
Larsen, deceased et al.

[11] 3,750,394
[45] Aug. 7, 1973

[54] STARTER ENGINE

[75] Inventors: Agnew E. Larsen, deceased, late of Jenkintown, Pa.; by William H. Larsen, executor, Doylestown; Manuel Weinstock, Philadelphia, both of Pa.

[73] Assignee: The United States of America as represented by the Secretary of the Army, Washington, D.C.

[22] Filed: Jan. 4, 1972

[21] Appl. No.: 215,294

[52] U.S. Cl. .............................. 60/39.14, 60/39.37
[51] Int. Cl. ........................................... F02c 7/26
[58] Field of Search ...................... 60/39.14, 39.37

[56] References Cited
UNITED STATES PATENTS

| | | |
|---|---|---|
| 3,280,556 | 10/1966 | Durctin et al. .................... 60/39.14 |
| 3,238,721 | 3/1966 | Brandes et al. .................... 60/39.14 |
| 2,982,095 | 5/1961 | Campbell .......................... 60/39.14 |
| 2,895,295 | 7/1959 | Carlson ............................. 60/39.14 |
| 3,633,360 | 1/1972 | Kelley ............................... 60/39.14 |
| 3,439,495 | 4/1969 | Binsley et al. .................... 60/39.14 |
| 3,675,417 | 7/1972 | Shum, Jr. ........................... 60/39.14 |

Primary Examiner—Carlton R. Croyle
Assistant Examiner—Warren Olsen
Attorney—Harry M. Saragovitz et al.

[57] ABSTRACT

A self-sufficient system for assuring reliable starting of aircraft engines including a plurality of propellant actuated initiators located in parallel arrangement adjacent corresponding jet fuel combustors to lead and direct the products of combustion directly onto the turbine blades of the starter engine for setting the same into motion long enough to enable the jet fuel combustion to take over in the starter.

1 Claim, 2 Drawing Figures

STARTER ENGINE

The invention described herein may be manufactured, used, and licensed by or for the Government for governmental purposes without the payment to us of any royalty thereon.

The invention relates to an engine starting system and more particularly, to a jet fuel starter for an aircraft engine.

A serious problem presently existing in aircraft engines is the chance of power plant "flame out" while in flight which may necessitate an abandonment of the aircraft by the pilot.

It is an object of the present invention to provide an aircraft engine system having an emergency re-start capability in the event of engine flame-out during flight.

A further object is to provide such an aircraft engine system having an independent self-sufficient re-starting capability for normal operation of the starter engine.

These and other objects, advantages and features will become more apparent from the following description and accompanying drawing in which.

Figure 1:
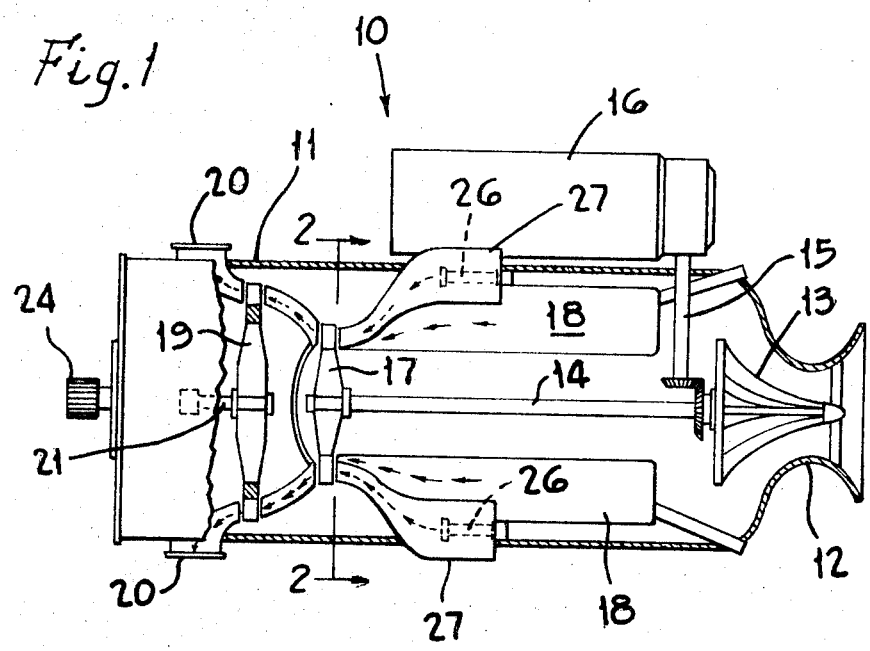
FIG. 1 is a longitudinal sectional view of a starter engine embodying the principles of the invention.
Figure 2:
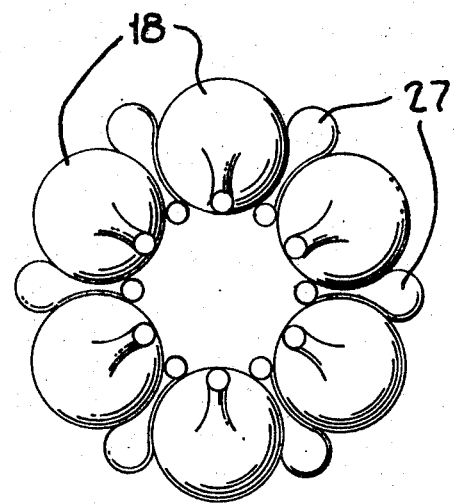
FIG. 2 is a sectional view with certain parts omitted, taken along lines 2—2 of FIG. 1.

The jet fuel starter engine system, shown generally at 10 (FIG. 1), includes a casing 11 having a funnel shaped air intake throat portion 12. A compressor 13 is mounted on one end of the central longitudinally extending shaft 14 adjacent a suitable pair of bevel gears that interconnect shaft 14 with shaft 15 of an appropriately mounted electric starter generator 16 containing suitable ring and pinion drive means. Generator 16 normally functions to impart rotary motion to compressor 13, its shaft 14 and primary turbine wheel 17 carried thereby and rotatable therewith. Air is thus drawn past the compressor 13 to mix with the fire gases drawn from the circumferentially spaced combustor chambers 18 (FIGS. 1, 2), such that the combustibly developed gas pressure will rotate or operate the main turbine blade 19 prior to exiting through exhaust passages 20. Connected to the main turbine 19 or its shaft 21 through a suitable gear reduction unit and torque convertor (not shown) is a power take-off gear or shaft 24 that is appropriately connected to an aircraft engine (not shown).

Corresponding cartridge initiators or gas generators 26 (FIGS. 1, 2) are suitably mounted in a manifold construction 27 that is nested upon and between the combustors 18. The arrangement is such that pressure gas developed by a selectively fired cartridge initiator will impinge upon and rotate the primary turbine blade 17 which starts or operates compressor 13 prior to combustor gases being fired to operate the main turbine blade 19, as described above. The ability to selectively fire these multiple cartridge initiators enables emergency re-starting of a stalled or disabled engine, a feature which can be repeated by firing another one or more of the initiators 26.

When it is desired to operate the starter engine by firing a cartridge initiator in place of the regularly functioning electric generator 16, the latter can be unloaded electrically by a pilot suitably switching to another electrical circuit (not shown) which preferably would ready the cartridge initiators 26 for electrical firing thereof by a pilot controlled selective ignition switch (not shown), although it is conceivable that the initiators could be fired electrically or mechanically.

Air from outside the starter engine is drawn past the respective fired cartridge initiator 26 to augment the developed pressure gas for impinging upon the primary turbine blade 17. Whereas air drawn by the compressor 13 enters the rearward combustors 18 and fires the jet fuel thereof. Excess air augments the generated pressure gas to enter the turbine and operate the main blade 19. The residue gas continues in the direction of the arrows toward exhaust ports 20.

We wish it to be understood that we do not desire to be limited to the exact details of construction shown and described for obvious modifications will occur to a person skilled in the art.

We claim:

1. A jet fuel self-sufficient starter engine comprising,
    a casing,
    air intake means at one end of said casing,
    a compressor mounted on one end of a shaft immediately inside said intake means,
    a primary turbine wheel mounted on the other end of said shaft,
    a plurality of combustors mounted around said shaft,
    a main turbine wheel adjacent said primary turbine wheel and actuated by gases developed in said combustors, and
    a plurality of propellant actuated initiators in fluid communication with said primary turbine wheel,
    each initiator having a nozzle in fluid communication with and directed at said primary turbine wheel in such a manner so that the generated propellant gases from any of said initiators impinge directly upon the turbine wheel blades to rotate said blades at a velocity sufficient to initiate normal operation of said compressor, combustors and turbines, each of said initiators being mounted in a manifold, said manifold being nested upon and located between adjacent ones of said combustors.

* * * * *